US006473666B1

(12) United States Patent
Samura

(10) Patent No.: US 6,473,666 B1
(45) Date of Patent: Oct. 29, 2002

(54) MANUFACTURING MACHINE OF ORIGINAL DESIGN WATCH OR ORIGINAL DESIGN DIAL

(75) Inventor: Hiroyoshi Samura, Minamitsuru-Gun (JP)

(73) Assignee: Kawaguchiko Seimitsu Co., Ltd., Yamanashi (JP)

( * ) Notice: Subject to any disclaimer, the term of this patent is extended or adjusted under 35 U.S.C. 154(b) by 0 days.

(21) Appl. No.: 09/309,568

(22) Filed: May 11, 1999

(51) Int. Cl.[7] ................................ G06F 19/00
(52) U.S. Cl. .......................... 700/117; 700/97; 700/233
(58) Field of Search ............................. 700/83, 95, 96, 700/97, 117, 231, 232, 233, 235; 705/26, 27; 29/896.3

(56) References Cited

U.S. PATENT DOCUMENTS 4,371,075 A * 2/1983 Erlichman ............... 198/345.3
4,502,382 A * 3/1985 Kunita et al. ............ 101/93.04
4,525,077 A * 6/1985 Ketner ....................... 368/223
4,650,348 A * 3/1987 Kaneko et al. ............... 400/22
4,879,450 A * 11/1989 Valentin et al. ........ 219/121.64
4,949,868 A * 8/1990 Olson .......................... 221/64
5,008,869 A * 4/1991 Dweck ....................... 368/228
5,027,504 A 7/1991 Mathez
5,513,116 A * 4/1996 Buckley et al. ............. 700/233
5,778,164 A * 7/1998 Watkins et al. ............ 358/1.18
5,818,717 A * 10/1998 Nunes ........................ 700/117
5,875,110 A * 2/1999 Jacobs ........................ 700/232
5,943,302 A * 8/1999 Fanshaw ..................... 368/276

FOREIGN PATENT DOCUMENTS

JP 51-123840 U * 10/1976
JP 1-275048 * 11/1989
JP 3-55133 * 3/1991
JP 4-122532 * 4/1992
JP 7-116935 * 5/1995

* cited by examiner

*Primary Examiner*—Leo Picard
*Assistant Examiner*—Paul Rodriguez
(74) *Attorney, Agent, or Firm*—Koda & Androlia

(57) ABSTRACT

An original design watch or original design dial for a watch manufacturing machine in accordance with a design information inputted by a customer to apply promptly its demand. The design information inputted by the customer through an input apparatus (2, 102) is transferred to a manufacturing apparatus (14, 114) and utilized as a command for operation and a design pattern to be drawn. The manufacturing apparatus (14, 114) chooses a housing assembly (20) or a dial plate (120) in accordance with the operational command of the design information, and prints the designed pattern of drawing, picture, photograph or character given by the customer on the dial in accordance with the design information. Then, the dial (120), watch hands and a cover glass are furnished onto the housing assembly (20) in accordance with the selection specified by the design information. The completed watch is sold by an automatic vending machine or by a sales person in usual manner.

10 Claims, 14 Drawing Sheets

MANUFACTURING MACHINE OF ORIGINAL DESIGN WATCH OR ORIGINAL DESIGN DIAL

DETAILED DESCRIPTION OF THE INVENTION

1. Field of the Invention

The present invention relates to a manufacturing machine of an original design watch with a dial made in accordance with a design information inputted as a drawing, which is figured on monitor screen of a personal computer, a photograph or a picture, which is selected or prepared by a customer himself.

2. Prior Art

Typically, watches are manufactured and sold by watch makers who decide their design based on surveys of customers' taste. However, nowadays there is a rising demand of watch with original design by customers who desire to have his own watch that no other one has in the world, or to put special words on the dial of it as a gift. For this kind of demand, it has been tried that watch makers prepare a wide range of selection from various designs of dial, watch hands and other component, then a customer orders a watch with option for combination of them, and the watch maker begins to make it individually in accordance with the optional order, or a watch maker makes a watch individually whose dial design was copied from a photograph, a picture or a drawing given by the customer.

The above stated watch employing dial design that was selected or given by the customer himself is thought much of value, however, there has been a problem that it takes too long from the time of ordering to a delivery.

There is another problem that it is not so easy to order because the customer is required to keep on a predetermined standard manner or regulation how to select and specify the design for his watch.

Further, because manufacturing of the watch is achieved at a factory of the watch maker, a sense of participation for the customer by himself is lacking in the above stated original design watch manufacturing and it does not always respond to the demand of customer who desires the original design watch made easily by himself.

The present invention is intended to solve above stated problems and it is an object of the present invention to provide a manufacturing machine of the original design watch or original design dial for the watch, by which a customer can get a watch and/or a dial for it on the spot which is made in accordance with a design selected or given by the customer himself.

SUMMARY OF THE INVENTION

In an original design watch manufacturing machine provided by the present invention, it chooses components of the watch, works upon and assembles them in accordance with a design information inputted through a design input apparatus by a customer himself. Assembling and other operation of this manufacturing machine are governed by a control apparatus.

In the original design watch manufacturing machine of the present invention, it chooses a housing assembly from a plurality of various kind of them as half finished goods which are beforehand prepared and stocked, in accordance with the directed information on color and shape by the design information transferred from the control apparatus, and sends the housing assembly to a manufacturing apparatus where machining and assembling are achieved. Then, the manufacturing apparatus draws a pattern, picture, photograph or characters on a dial plate for the watch by printing, or by other manner alike in accordance with the inputted design information, then it furnishes a designated hands, and put a specified cover glass to complete the watch. Further, when it is requested, it packs and wraps the completed watch to deliver it to the customer.

In the original design watch manufacturing machine provided by the present invention, the above described housing assembly which are previously stocked may be a half finished goods contains movement and dial plate in a housing and it may also be furnished with a wrist band.

The original design watch made by the manufacturing machine of the present invention is completed with processes of fabrication and furnishing of dial, watch hands and cover glass from front side of the housing assembly of above described half finished goods.

Moreover, the manufacturing machine of the present invention can be provided with a coin counting apparatus which recognizes and calculates coins, and makes changes, which enables automatically to manufacture and sell the original design watches in a vending machine.

The original design watch manufacturing machine of the present invention comprises a dial drawing means which draws a designated design pattern as a printing layer on a specified part of the dial plate in accordance with the design information transferred from the input apparatus. The dial drawing means consists of a drawing means and other means, which are governed by the control apparatus.

The manufacturing apparatus of the original design dial provided by the present invention chooses a dial plate from a plurality of stocked dial plates in accordance with the design information and brings them to the drawing means. In another aspect of the invention, it is possible to apply an embodiment with different arrangement of the manufacturing machine in which the selected dial plates is mounted on the drawing means manually by hands of the customer. Then by the drawing means, the dial is completed with a process of drawing the designated pattern, picture, photograph or characters on the surface of the watch face plate by printing in accordance with the inputted design information.

The dial plate of the present invention which is previously stocked, is composed with an under layer to make adhesion better to the printing layer as well as to prevent occurrence of a stain or a spot on the printing layer, or it is composed with a base plate on which the under layer is made. When in case the dial plate is made only by the under layer, the watch face is completed with a process that the printed under layer is stuck onto a surface of the base plate after printing automatically by a sticking apparatus or manually with a sticking jig.

The original design dial made by the manufacturing machine of the present invention consists of the base plate, the under layer arranged on the base plate, and printed layer which is formed on the under layer in accordance with the design information. The under layer of the original design dial is made of a paper, synthetic resin film or porous coated layer to maximize adhesion and to minimize occurrence of a stain or a spot on the printed layer. The existence of this layer makes the printing process on the original design dial plate easier.

EMBODIMENTS

Figure 1:
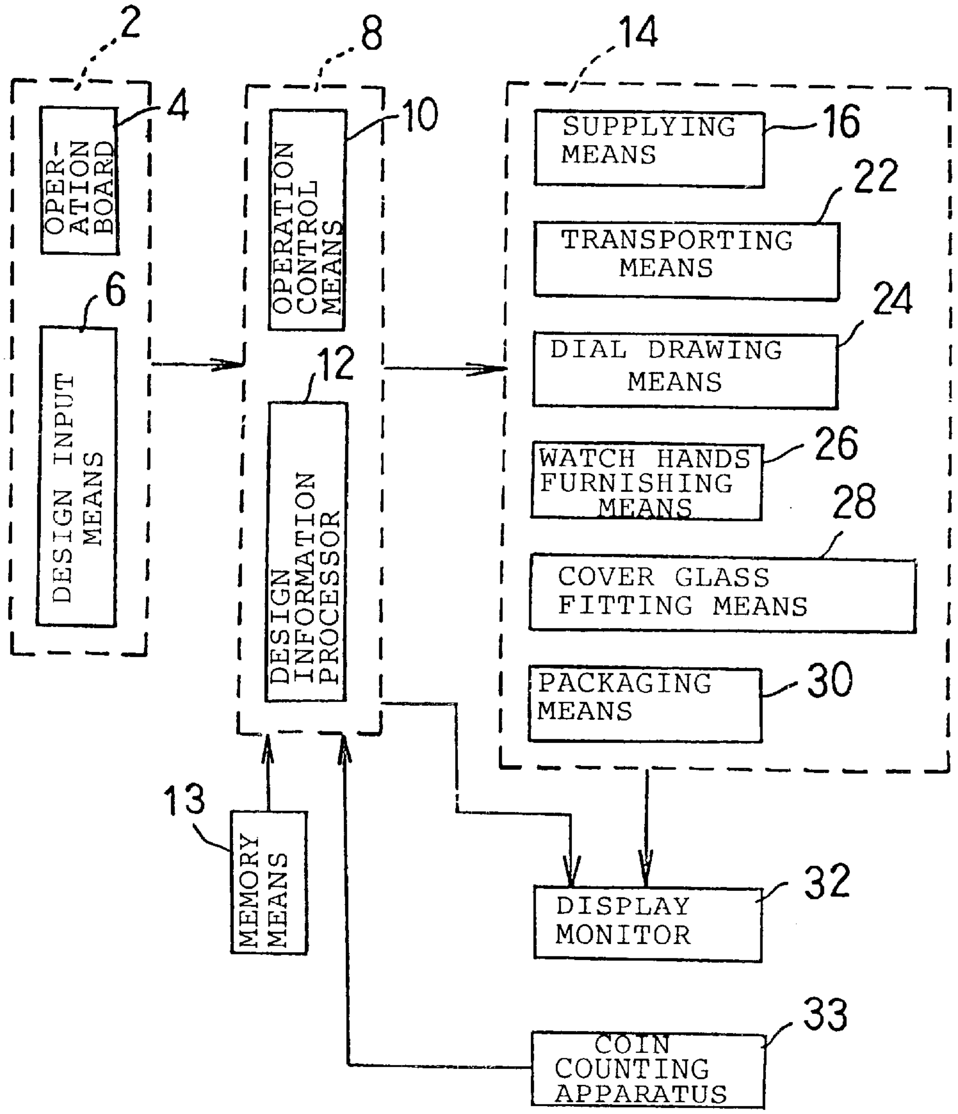
FIG. 1 is a block diagram of one embodiment of the original design watch manufacturing machine provided by the present invention to show its composition.
Figure 2:
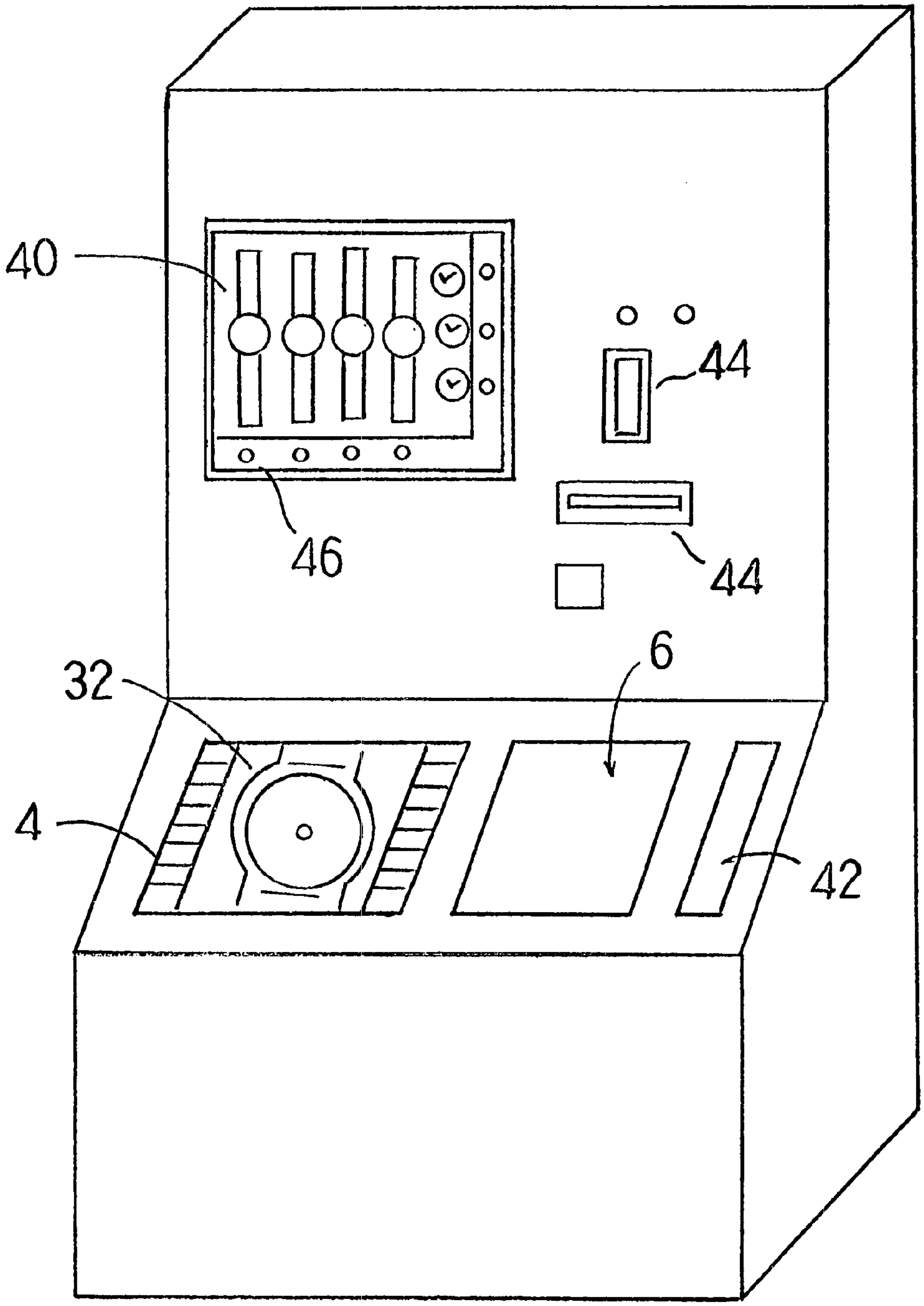
FIG. 2 is an outside view of the original design watch manufacturing machine of FIG. 1.
Figure 3:
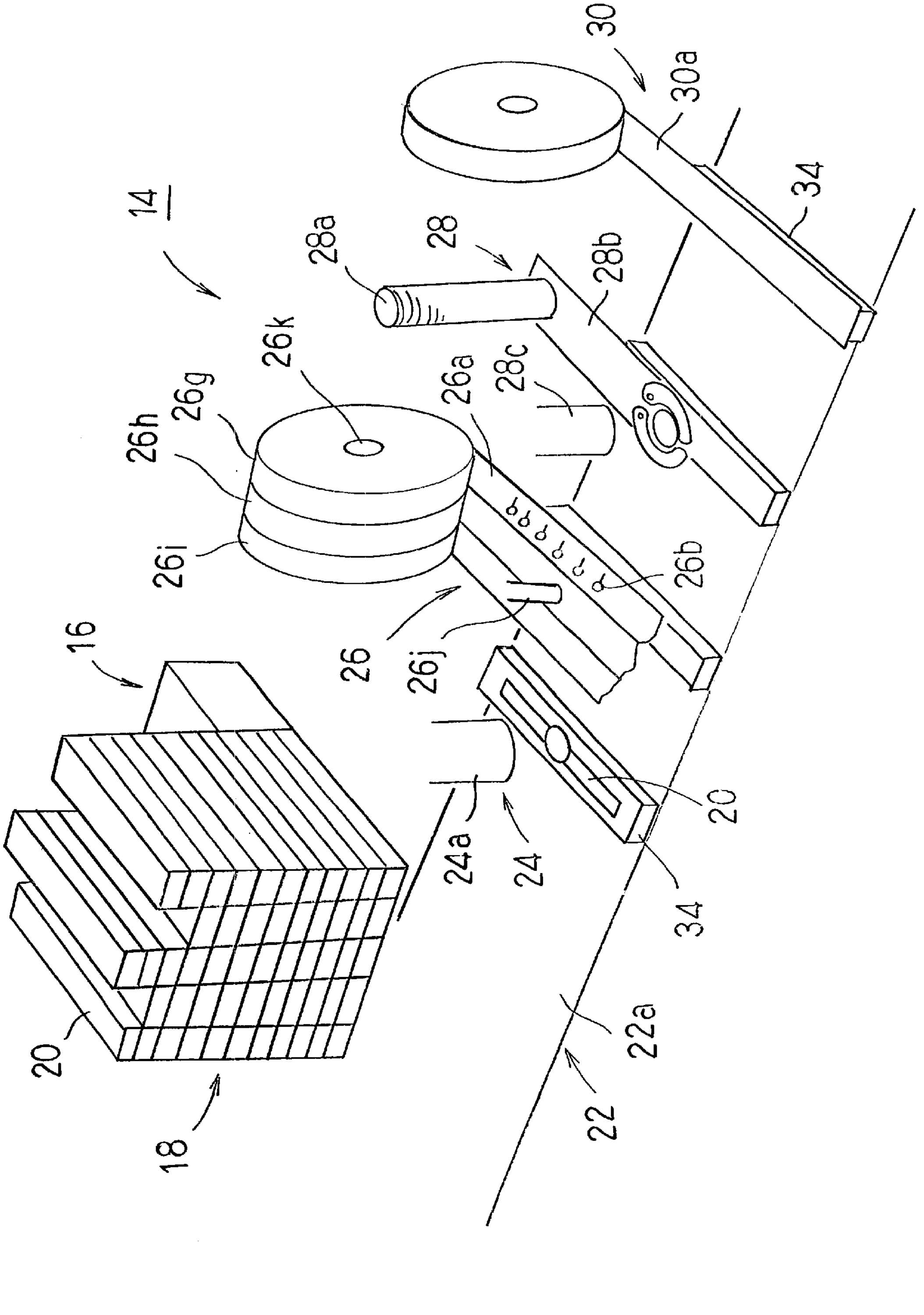
FIG. 3 is an inside view of the original design watch manufacturing machine of FIG. 1 to show its arrangement.

FIG. 1 is a block diagram of one embodiment of the original design watch manufacturing machine in accordance with the present invention to show its composition, FIG. 2 is an outside view of it and FIG. 3 is an inside view of it to show its arrangement. An input apparatus 2 consists of an operation board 4 including switches, for example, touch switches arranged on a screen of display monitor, by which a direction for selection of previously stocked parts of watch in the machine and a direction for designing to be drawn on the screen are inputted, and a design input means 6 including a scanner by which a design pattern on a photograph or picture is directly inputted.

A control apparatus 8 governs the display monitor and a manufacturing apparatus in accordance with the direction or the design information transferred from the input apparatus 2. The operation of manufacturing apparatus will be described later in detail. The control apparatus 8 includes a micro computer and it consists of an operation control means 10 by which the operation of the manufacturing apparatus is governed, and a design information processor 12 by which inputted design information pattern is magnified, compressed or transferred to be adopted for selection of the parts of watch. In one embodiment, the design processor 12 may read out the design information from a memory means 13 which is arranged in or out of the control apparatus.

The manufacturing apparatus 14 achieves the selection and assembling of the parts of watch and it consists of several means described below. By a supplying means 16, a housing assembly 20 is selected and took out from a parts storage 18 such as shown in FIG. 3 and put out on an transporting means 22. Then by the transporting means 22, the housing assembly 20 taken out by the supplying means 16 is brought to each stage of manufacturing where machining and assembling are achieved. A dial drawing means 24 includes a printer such as thermal printer, ink jet printer or photo exposing printer, and it draws a designed pattern on the dial in accordance with the inputted design information. A watch hands furnishing means 26 chooses a set of hands designated from various types of watch hands, and fits them to an axis of the watch hands by the direction. A cover glass is selected and fitted on the assembly case by a cover glass fitting means 28. Then, the completed original design watch is wrapped with a cover paper or seal paper by a packaging means 30 and sent to an outlet hole 42 in FIG. 2. Mechanical structure of each means will be described later in detail.

A display monitor 32 shows a direction from the control apparatus 8, a direction inputted by a customer, an inputted or designed picture or pattern on a screen as well as lamps with turning on and off. It also shows shape or color of the stocked parts or progress of assembly of the watch taken by, for example, an electronic camera.

A coin counting apparatus 33 recognizes insertion of coins or paper moneys from a insertion hole 44, counts them and makes change as well as sends a signal to the control apparatus 8 that tells payment of the charges to begin the operation of manufacturing for the original design watch.

Figure 4:
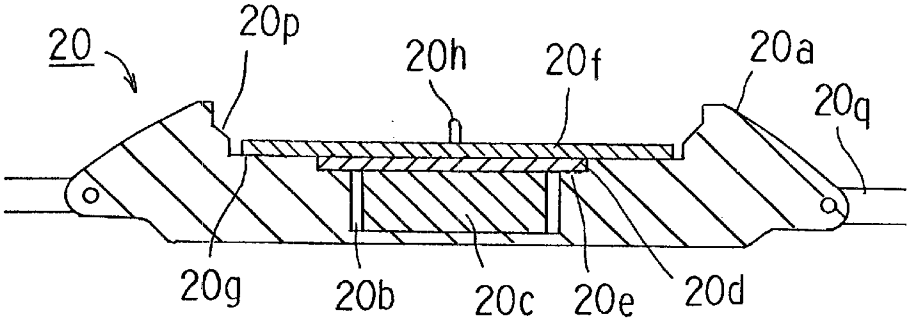
FIG. 4 is a cross sectional view of the housing assembly used for the embodiment of the original design watch manufacturing machine of FIG. 1 to show its arrangement.
Figure 5:
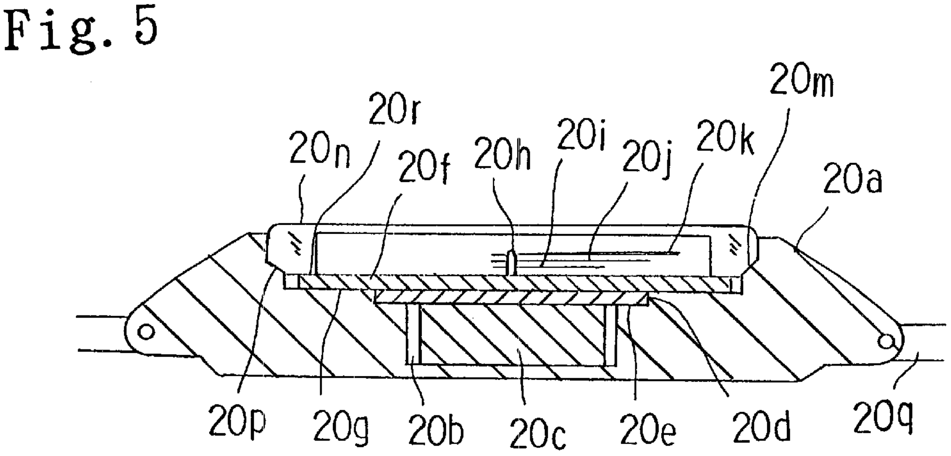
FIG. 5 is a cross sectional view of the completed original design watch made of the housing assembly of FIG. 4.
Figure 6:
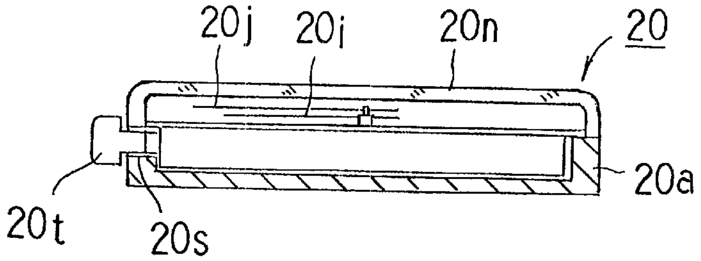
FIG. 6 is a cross sectional view of another type of completed original design watch made of another housing assembly and cover glass which are different from the watch of FIG. 4.

Hereafter an explanation about structure of the housing assembly 20 stocked in the manufacturing apparatus 14 and mechanical structure of the manufacturing apparatus 14 will be given. As described above, a housing assembly 20 which has previously stocked as a half finished goods, consists of a watch housing 20*a* in which a back cover is formed as one body which is shown in FIG. 4. In the center portion of the housing 20*a,* there is a hollow 20*b* and a movement 20*c* is put there and an implicating member 20*d* which is arranged is in a front portion of the movement 20*c* and a fist step portion 20*e* which is arranged in the hollow 20*b* hold together to fix the movement 20*c* in the housing 20*a* The dial plate 20*f* is put on the front side of the movement 20*c* and it is fixed on a second step portion 20*g* which is arranged around the first step portion 20*e*. For the housing assembly 20 with the above described formation, the selected design pattern is drawn on the dial plate 20*f,* then an hour hand 20*k,* a minute hand 20*j* and a second hand 20*i* are fixed onto the hands axis 20*h* of movement 20*c* as shown in FIG. 5. A slanted portion 20*m* of the cover glass 20*n* is put on a slanted portion 20*p* which is arranged at an outer edge of the second step portion 20*g* in the housing 20*a,* and fixed on it by means of welding or injection, and the watch is completed. The movement 20*c* of original design watch with above described formation can not move horizontally and rotationally because a watch stem, for example a watch stem 20*t* as shown in FIG. 6 or alike, is furnished through a hole, for example a hole 20*s* as shown in FIG. 6 or alike, which is arranged in the side wall of the housing 20*a,* and also it can not move vertically along the hands axis because the watch face plate 26*f* is put between an outer bottom portion 20*r* of the cover glass 20*n* and the second step portion 20*g* of the housing 20*a* when they are furnished, then the movement 20*c* is tightly fixed.

The slanted portion 20*p* of housing 20*a* in the housing assembly 20 is arranged to make the printing process of dial easier because much wider working space can be obtained. Further, to make the printing process of dial easier, a different type of cover glass 20*n* with a round edge can be applied in another embodiment of the invention to make a space for watch hands instead of the top portion of the housing 20*a* as shown in FIG. 6. Further, with regard to the hands axis 20*h* of movement 20*c,* it can be arranged not to project out of the watch face to make printing much easier by using of watch hands with long stumpy leg.

With regard to the wrist band 20*q,* they are prepared in two different style, one with being furnished beforehand to the housing 20*a* and another with being unfurnished to the housing. In case of selection for the wrist band 20*q* with unfurnished to the housing, it may be applicable that the completed original design watch and the unfurnished wrist band are supplied together to deliver to the outlet hole 42 and the customer furnishes the wrist band to the watch by himself.

Figure 7:
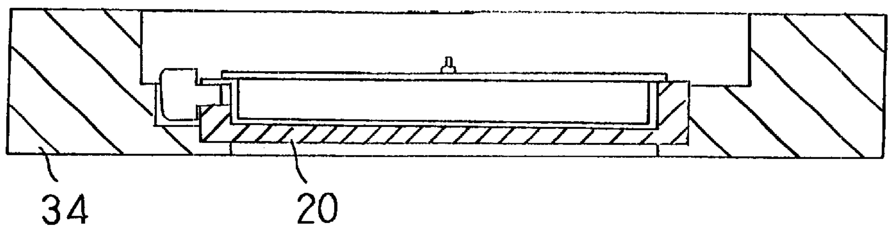
FIG. 7 is a cross sectional view along its width direction of a carrying case which is employed for the original design watch manufacturing machine of FIG. 3.
Figure 8:
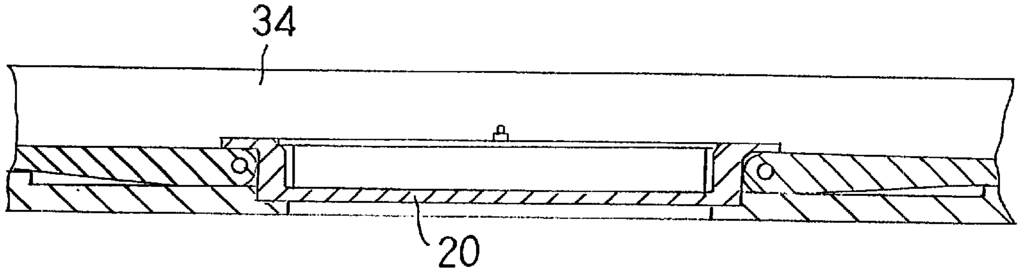
FIG. 8 is a cross sectional view of the carrying case of FIG. 7 along its length direction.

In the meantime, one example of mechanical structure of the manufacturing apparatus 14 is shown in FIG. 3. In this embodiment, the supplying memo 16 is arranged to select a housing assembly 20 in accordance with the direction from the parts storage 18 in which various colors and shapes of them are previously stored, and push it to the transporting means 22. Each housing assembly 20 stocked in the parts storage 18 is put on a carrying case 34 that has opened portion from which side the processing is done as shown in FIG. 7 and FIG. 8, and it is supplied within the carrying case 34 to the transport means 22.

The transporting means 22 consists of a belt like moving member 22*a* such as a belt feeder by which the housing assembly 20 can be brought toward each operation unit for machining and furnishing, and stopped to be machined or furnished. In this moving member 22*a,* a holding member such as a hollow portion or projecting portion, which is not shown in the Figure, is arranged to keep and bring the carrying case 34 toward each operation unit.

The dial drawing means 24 consists of a drawing means, such as a thermal printer, an ink jet printer or a photo exposing printer, and its printing or exposing head member 24*a* is arranged at the dial processing unit to print or to expose the design on a dial plate 20*f* in FIG. 4. For example, when a thermal printer is utilized, the printing head member 24*a* consists of a face type dot heater which is in the same shape as the dial and the designed pattern is drawn by an operation that the printer head 24*a* is pressed vertically and ink on a ribbon is transferred to the dial. In this case of employment of printing head member 24*a* with the face type dot heater, it needs only to move not horizontally but vertically against the dial, since there are no problem for printing even when the axis of movement for the watch hands is projecting from the dial itself and it also realizes shorter time of printing.

In addition to the above described drawing means, the dial drawing means 24 may consist further of a means which sticks a transparent ultraviolet ray absorption film on the printed dial to prevent a fading of the printed pattern by a chemical reaction of ultraviolet ray. In one embodiment, the transparent material film for ultraviolet ray absorption is prepared beforehand with glue for every size of the dial, and after the drawing of designed pattern for the dial has been completed, the film is supplied on the dial and stuck on it by a pressing member. In this embodiment, the printed pattern is protected from fading, and it keeps long its vividness by sticking of the ultraviolet ray absorption film on the printed dial.

Further in other embodiment the watch face drawing means 24 may consist of a means to furnish metal watch characters with appearance of rare metallic gloss. In this embodiment the process for watch characters is selectively directed through an inputted order on the operation board 4 and completed not by printing but by sticking metal watch character. This sticking means consists of a select member by which a set of watch characters with glue is selected from a plurality of designed characters stocked beforehand, a supplying member by which the set is put on the printed dial, and a press member by which the set is pressed to be stuck on. The pressing process of the watch characters can be achieved after the printing process or after the sticking of the above described ultraviolet ray absorption film. The use of above described metal characters gives an appearance of higher grade goods because of metallic gloss. Further, when it is arranged on the transparent ultraviolet ray absorption film, it gives a stereoscopic feeling. Thus, adding of the ultraviolet ray absorption film sticking means and the metal watch character sticking means to the dial drawing means 24 brings an appearance of higher grade goods into the watch and it keeps vividness of the printed pattern long.

Figure 11:
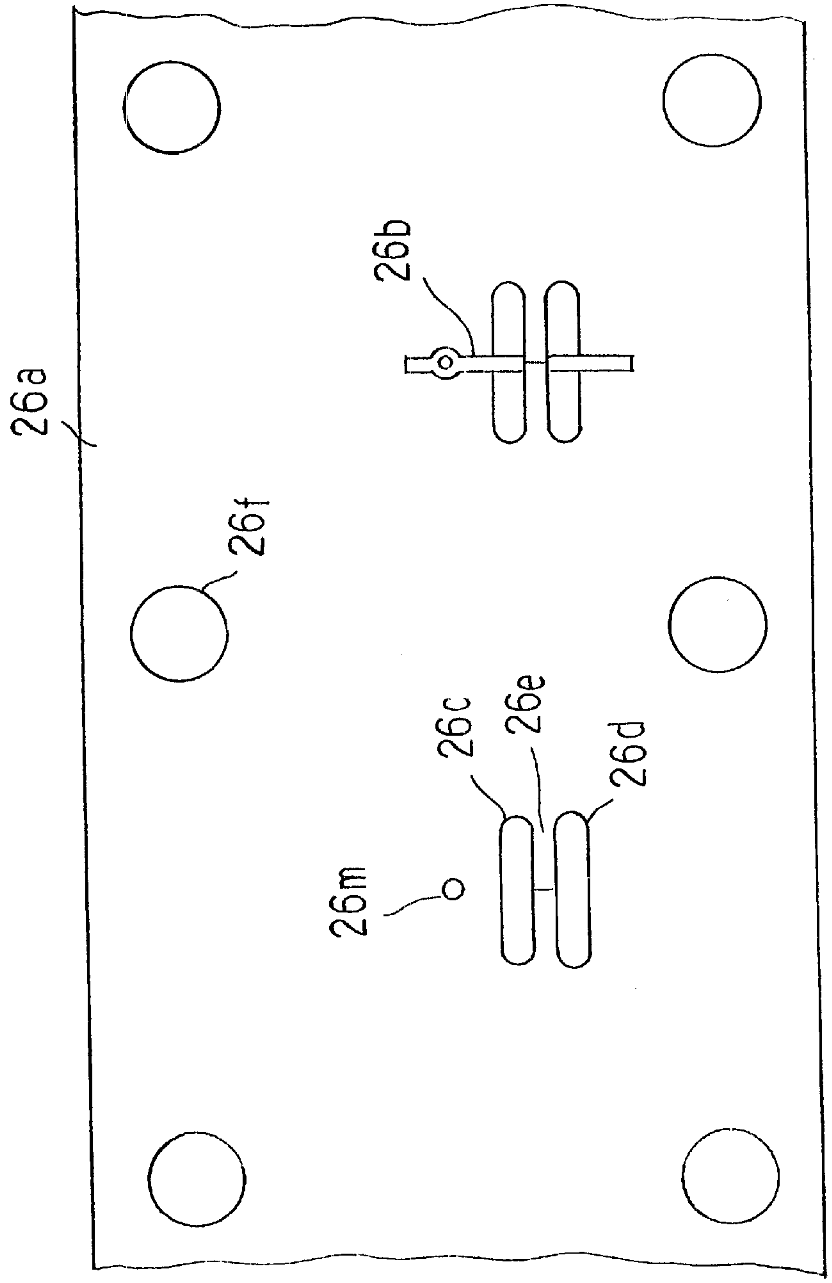
FIG. 11 is a plan view of belt like member which is employed for the watch hands furnishing apparatus of FIG. 3.

A watch hands furnishing means 26 consists of a plurality of reels 26*g,* 26*h* and 26*i* each of which a belt like member 26*a* is loaded on and hour hand 20*i,* minute hand 20*j* and second hand 20*k* are separately stuck to be easily detachable on the belt like member. The furnishing means 26 with pressing head 26*j* detaches the watch hand 26*b* from the belt like member 26*a* and put it on the watch axis of movement to be pressed by the head 26*j.* In one embodiment, an arrangement can be employable that a plurality of different designed watch hands are stuck together on the same belt like member, and another embodiment a set of the same designed hour hand, minute hand and second hand is stuck in line on one belt like member, The above described reels 26*g,* 26*h* and 26*i* are rotatably supported on a reel axis 26*k* and they are moved along this axis 26*k* or moved with the axis to be selected and to be placed at the furnishing position for hour hand, minute hand and second hand to be furnished on the axis of movement. In another embodiment, plurality of pressing heads are arranged separately for each hour hand, minute hand and second hand in a corresponding furnishing position of those hands which are pulled out from each reel 26*g,* 26*h* and 26*i* and the heads press them separately to complete furnishing of the hands. The belt like member 26*a,* as shown in left side of FIG. 11, has two slits 26*c* and 26*d* which are made in parallel position, and a hole 26*m* onto which the stumpy leg of watch hand is put. The watch hand is inserted to the slits 26*c* and 26*d* and held by the stumpy leg hole 26*m* and the holding portion 26*e* between the slit 26*c* and 26*d* as shown in right side of FIG. 11, A notch is arranged in the center of holding portion 26*e* and the holding portion 26*e* is broken to release the hand 26*b* by [a press] pressing from the back side of FIG. 11. On the belt like member 26*a,* pilot holes 26*f* by which the belt like member 26*a* and the watch hands 26*b* are positioned correctly, are arranged in every predetermined distance. In this embodiment the hour hand, minute hand and second hand are employed, however needless to say, it is no problem that only hour hand and minute hand are employed.

Figure 12:
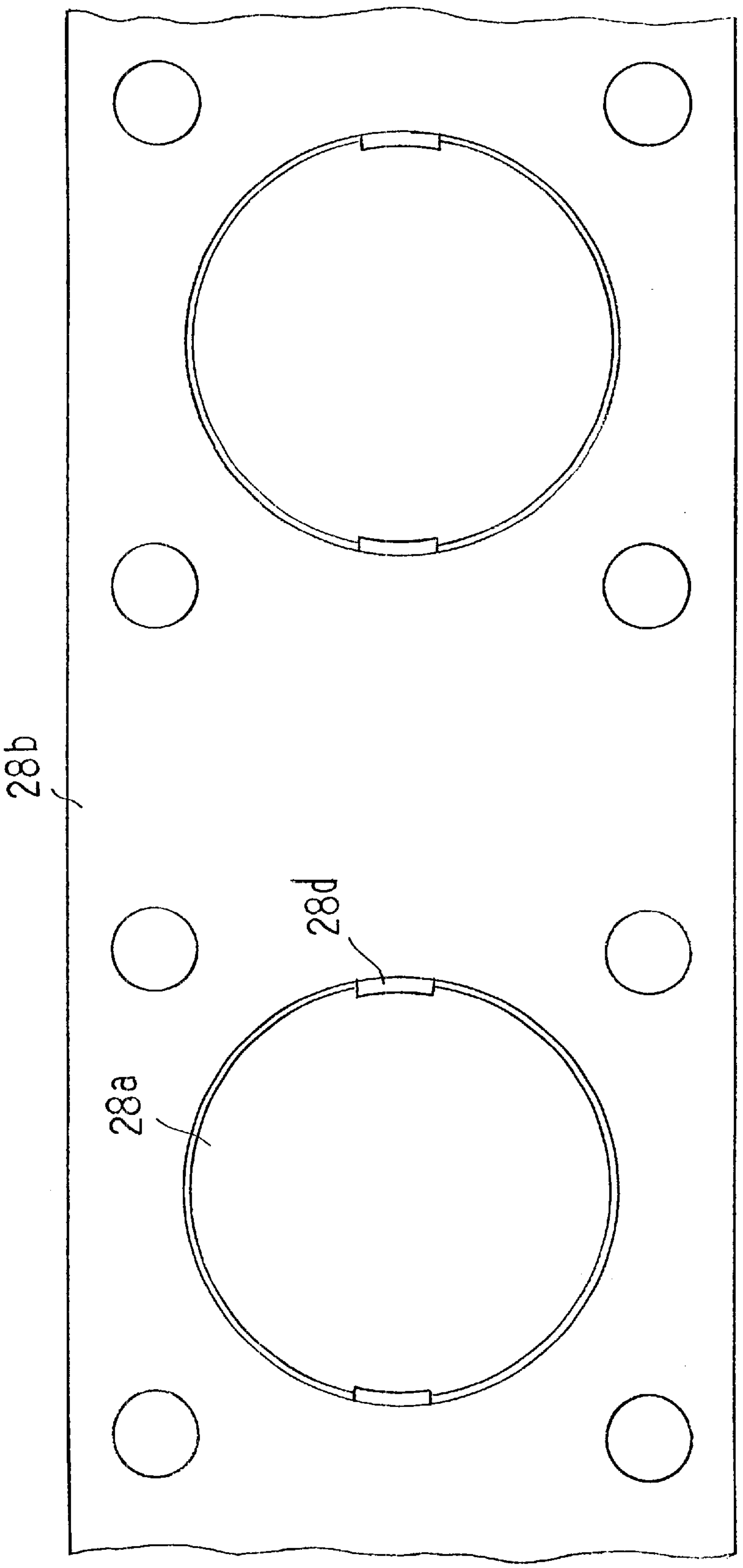
FIG. 12 is a plan view of the belt like member which is employed for another method of a cover glass supply for the cover glass furnishing apparatus of FIG. 3.

The cover glass fitting means 28 brings each cover glass 28*a* to the fitting position and a furnishing member 28*c* presses or welds it at circumference of the glass to fix the cover glass onto the housing assembly 20 as shown in FIG. 5. The cover glass 28*a* is also supplied by a belt like member 28*b* and held by a claw portion 29*d* as shown in FIG. 12 in the same manner for the above described watch hands 26*b.*

Figure 9:
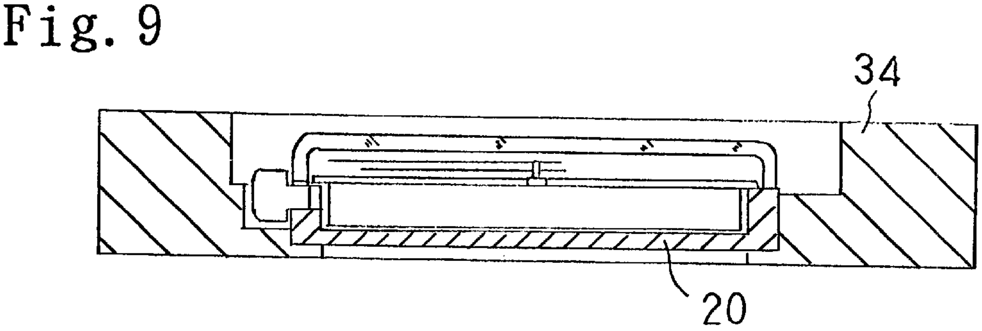
FIG. 9 is a cross sectional view of the carrying case of FIG. 7 to show the watch hands and a cover glass attached to the housing assembly.
Figure 10:
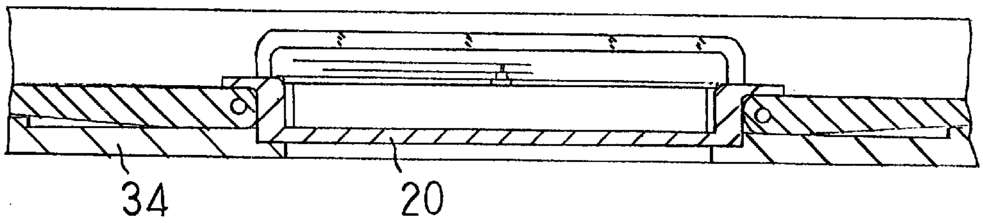
FIG. 10 is a cross sectional view of the carrying case of FIG. 8 to show the watch hands and a cover glass attached to the housing assembly.

In one embodiment, an arrangement is employed that the packaging means 30 sticks a sheet 30*a* which is transparent or on which the product name is printed, to the opened portion of carrying case 34 in which the completed watch is held as shown in FIG. 9 or FIG.10, cuts it and pushes the product within the carrying case 34 out from the moving member 22*a* to an outlet hole 42.

Hereafter, an explanation of manufacturing process for the original design watch made by the above described manufacturing machine will be given. At first a customer put money or coin into an inlet hole of the coin counting apparatus 33, and it recognizes a payment of required amount, then the control apparatus 8 outputs a signal to begin the manufacturing process. The customer confirms a feeling and appearance of finished goods with viewing the samples 40 which are displayed in a show case or viewing an image of the housing assembly 20 which is shown on the display monitor 32 as shown in FIG. 2 and chooses a housing assembly 20 and designates color, pattern, style and other factors of original design watch by ordering through the operation board 4. At this time, it is possible for a customer to select a watch housing assembly 20 without strap 20*q* which is shown in FIG. 4, and in such case he can selects also the watch strap by himself.

In the show case, samples 40 of different designed parts are displayed, which are not only the housing assembly but watch hands, cover glass and watch strap. With regard to the watch ads, various designed watch hands which are different in width, length and color are displayed. With regard to the cover glass, various different designed cover glass such as rounded one, squared one, partly color printed one or one with bezel, are also displayed, And fewer with regard to the strap, various different kind of straps which are made of metal, leather or synthetic resin with various different color and designs are also displayed.

On the display monitor 32, explanation for function of the touch switch as the operation board 4 are given in character or illustration as well as the display of parts for the watch to be selected, and the customer touches directly the displayed explanation with his fingers to input his selection. At this time, the selection of customer's favorite model for the watch hands and cover glass from various designs of them which are previously stocked, are also achieved by an input operation through the touch switch with viewing samples in show case. Thus, because the customer can confirm the feeling and appearance of finished goods by the displayed samples, it is possible for the customer to get the completed watch made by the above described manufacturing machine in accordance with his original image. Further, the selection for watch parts may includes those for a watch stand or watch chain as accessory.

The situation of inventory is also shown by a display of lamp 46 or on the display monitor 32 which are arranged in correspondence with the position of samples of the goods 40, and it tells if the designated model is sold out and out of stock. The customer selects his model under confirmation of this situation.

The customer inputs a design pattern for his watch face other than the above described selection of watch parts. The designing of dial is accomplished by selection or composition of various design variation which is output from a memory means 13 and displayed on the monitor 32 and the customer achieves it with confirmation of displayed pattern through the operation board 4. On the other hand, the designing is also attained by input of a designed pattern of a picture or photograph through the input means 6, and by change and modification of them with viewing the display of monitor screen 32. Further, the designing is also accomplished by direct input of a drawing pattern on the display monitor 32 on the spot. In this time, parts of the drawing pattern, such as characters, signs and marks can be output independently from the memory means 13 and added to the design of dial.

There is an arrangement that above described selection of housing assembly and creation of original design for dial are possible to be attained by the control of operation board 4 in arbitrary order as well as the selection and creation are accomplished in the predetermined order of process in accordance with the steps of watch manufacturing which is specified on the display monitor 32. The customer checks and confirms the appearance of the designed watch to be completed on the display monitor 32, amends it when it need, and then orders for the manufacturing apparatus 14 to begin the actual process.

The control apparatus 8 drives the manufacturing apparatus 14 in accordance with the inputted direction and design information by the customer. The supplying means 16 chooses a housing assembly 20 within the carrying case 34 in accordance with the output signal from the operation control means 10 and pushes it out on the transporting means 22. The housing assembly 20 is brought by the transporting means 22, and the created and selected original design pattern of the watch face is drawn on the face of it by the dial drawing means 24.

In one embodiment, a printer is employed as a designed pattern drawing means on the dial. A thermal printer, an ink jet printer or a photo exposing printer can be employed as the drawing means. In case of the thermal printer, ink ribbons each of which is containing one of dye from 4 colors of yellow, magenta, blue and black, are placed between the dial and the printing head 24*a* and they are pressed by the head 24 for each dye of the 4 colors to be transferred thermally onto the dial to develop the colored design pattern. In case of this embodiment for a thermal printer, an employment of under layer which brings better adhesion of the dye on the dial is preferable. In another embodiment for an ink jet printer, each ink including dye is directly sprayed on the dial without using ink ribbons to draw the designed pattern. Further in other embodiment for a photo exposing printer, a photo sensitive emulsion layer is coated on the dial and an exposure of light is achieved to figure the designed pattern in accordance with the design information.

Then the housing assembly 20 is brought again for the watch hands and the cover glass to be attached by the watch hand furnishing means 26 and the cover glass fitting means 28. Finally the completed watch is wrapped up by the packaging means 30 and pushed out to the outlet hole 42.

There is an arrangement that the above described manufacturing process can be seen directly through a transparent glass, or it can be monitored at each process of the manufacturing on the display monitor screen 32 by electronic cameras.

There is another embodiment that the coin counting apparatus 33 is not included in the machine and the manufacturing operation is started by a manual operation of salesman and the completed original design-watch is sold by him.

Figure 13:
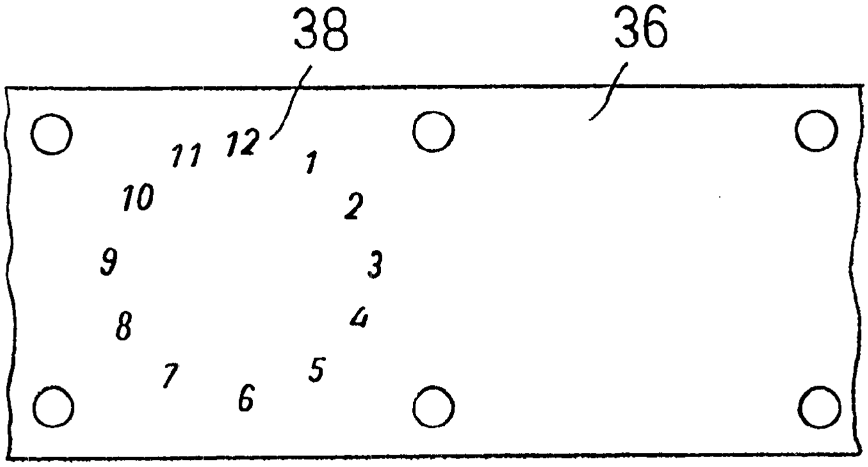
FIG. 13 is a plan view of the belt like member to explain a method of watch characters supply by sticking them onto the dial.
Figure 14:
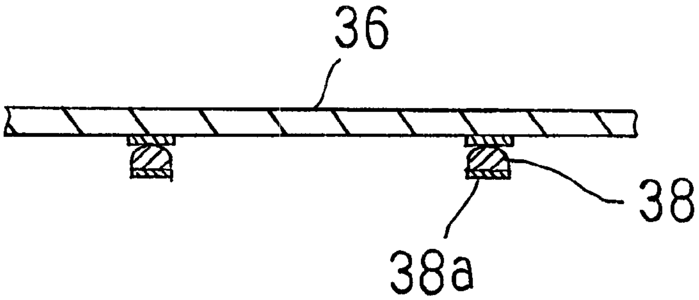
FIG. 14 is a cross sectional and expanded view of watch characters of FIG. 13.

Further in other embodiment, there is an arrangement that stickable characters or marks 38 with metallic gloss such as made by plating, are composed on a film as the belt like member 36, then they are transferred onto the dial and stuck by an adhesive layer 38*a* which is coated at the bottom of them after the drawing of dial to give a stereoscopic feeling as shown in FIG. 13 and FIG. 14.

In the above described embodiment, the explanation was given for manufacturing and sales of the wrist watch, however, the present invention should not be understood and limited in the application for manufacturing and sales of the wrist watch, and it can be applicable to the manufacturing and sales of a small table clock, a small wall clock or a travel watch.

Hereafter an explanation for another embodiment of the present invention will be given in which the manufacturing for a customer who intends to buy only an original design dial without the movement in accordance with his selection of design information is achieved.

Figure 15:
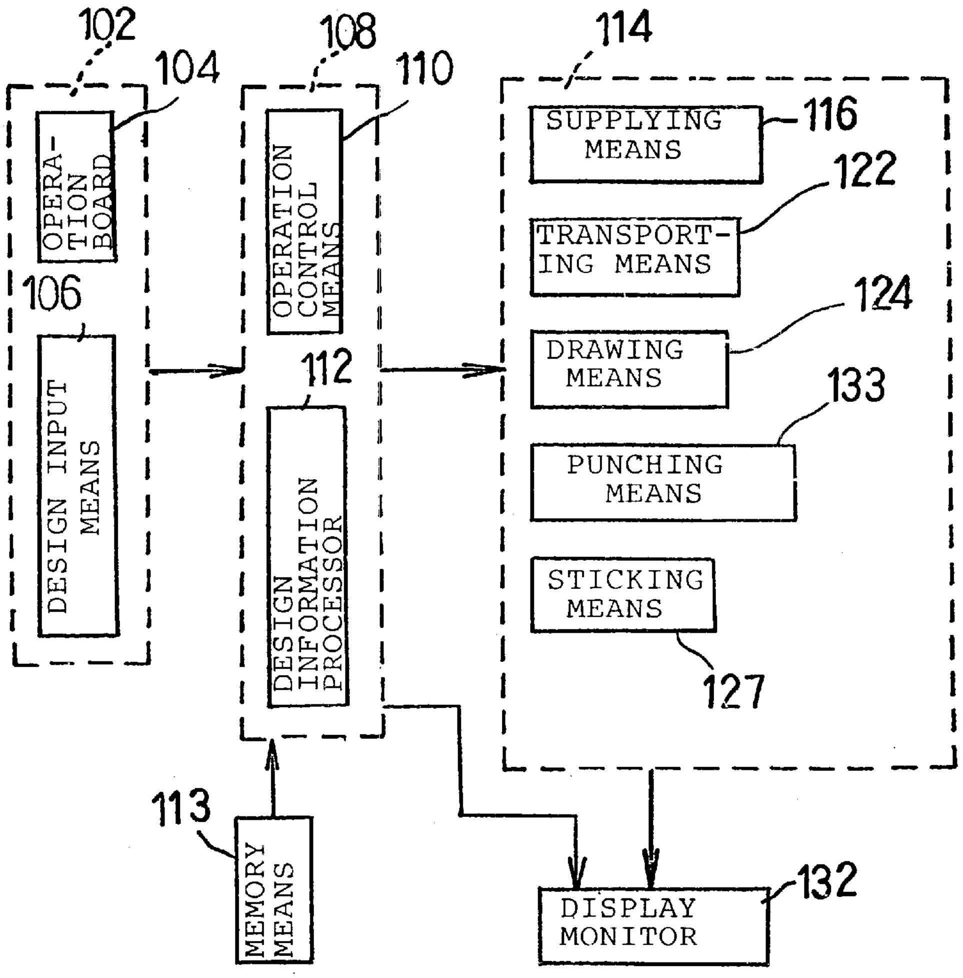
FIG. 15 is a block diagram of another embodiment of the original design watch manufacturing machine provided by the present invention to show its composition.
Figure 16:
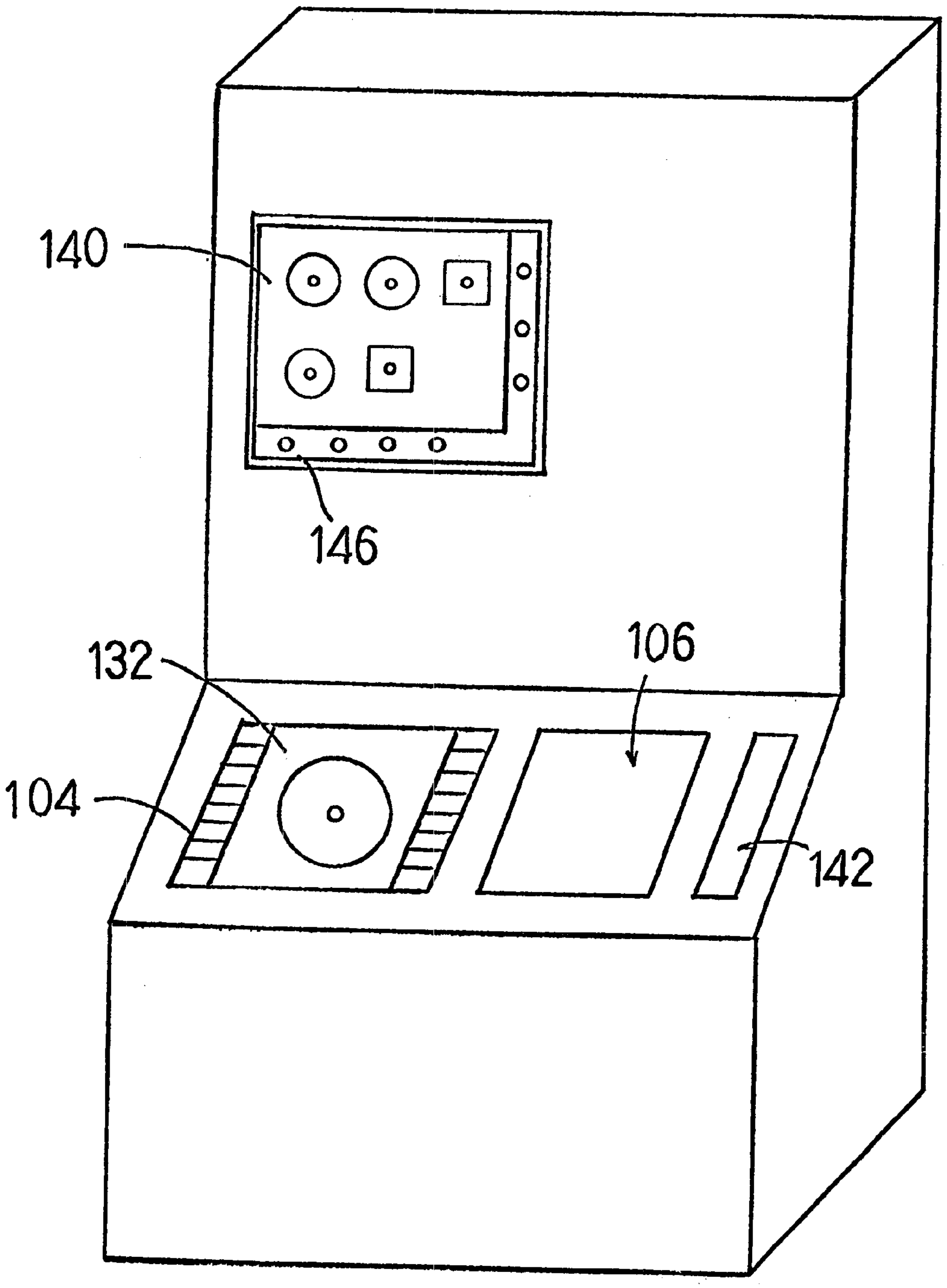
FIG. 16 is an outside view of the original design watch manufacturing machine of FIG. 15.
Figure 17:
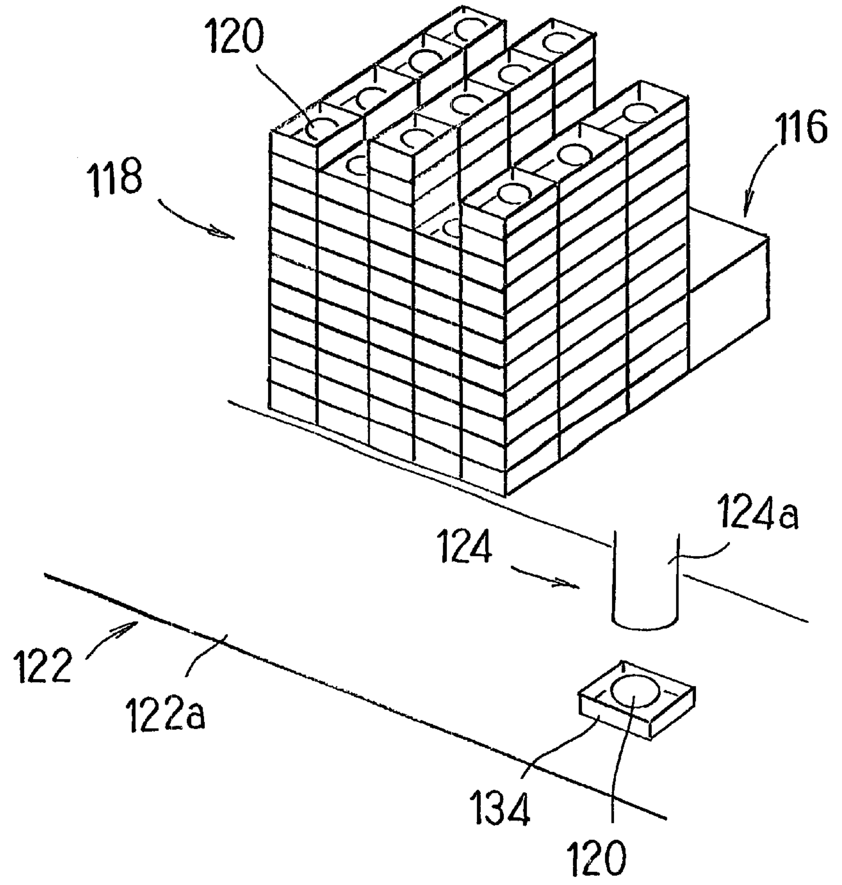
FIG. 17 is an inside view of the original design watch manufacturing machine of FIG. 15 to show its arrangement.

FIG. 15 is a block diagram of another embodiment of the original design dial manufacturing machine in accordance with the present invention to show its composition. FIG. 16 is an outside view of the original design watch face manufacturing machine of FIG. 15. FIG. 17 is an inside view of the original design dial manufacturing machine of FIG. 15 to show its arrangement.

An input apparatus 102 consists of an operation board 104 including switches, for example, touch switches arranged on a screen of display monitor, by which a direction for selection of previously stocked parts of dial in the machine and a direction for designing to be drawn on the screen are inputted, and a design input means 106 including a scanner by which a design pattern on a photograph or picture is directly inputted.

A control apparatus 108 governs the display monitor and a manufacturing apparatus in accordance with the direction or the design information transferred from the input apparatus 102. The operation of manufacturing apparatus will be described later in detail. The control apparatus 108 includes a micro computer and it consists of an operation control means 110 by which the operation of the manufacturing apparatus is governed, and a design information processor 112 by which inputted design information pattern is magnified, compressed or transferred to be adopted for the parts of dial In one embodiment, the design processor 112 may read out the design information from a memory means 113 which is arranged in or out of the control apparatus.

The manufacturing apparatus 114 achieves the selection and assembling of the parts of dial and it consists of several means described below. By a supplying means 116, a dial plate 120 is selected and took out from a parts storage 118 such as shown in FIG. 17 and put out on an transporting means 122 for which detailed description will be given later. Then by the transporting means 122, the dial plate 120 taken out by the supplying means 116 is brought to a stage of printing where drawing designed pattern is achieved. When in an arrangement that an operator sets the dial plate 120 on the stage of printing by himself, it is needless to comprise the supplying means 116 and the transporting means 122. A drawing means 124 includes a printer such as thermal printer, ink jet printer or photo exposing printer and it draws a designed pattern in accordance with the inputted design information on designated dial plate 120. A sticking means 127 sticks an under layer to a base plate when the dial plate 120 is made of only the under layer. When in an arrangement that the sticking of this under layer is attained by manual operation, or when in use of base plate on which the under layer is previously arranged, it is needless to comprise the sticking means 127. Mechanical structure of each means will be described later in detail.

A display monitor 132 shows a direction from the control apparatus 108, a direction inputted by a customer, an inputted or designed picture or pattern on a screen as well as lamps with turning on and off. It also shows shape or color of the stocked parts of dial or progress of drawing of the dial taken by, for example, an electronic camera.

Figure 18:
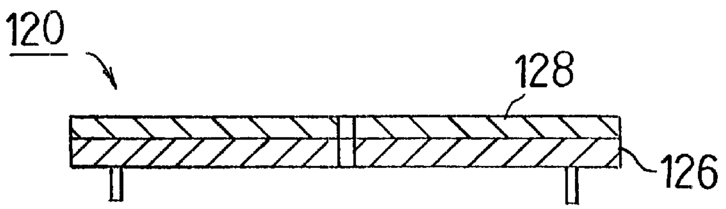
FIG. 18 is a cross sectional view of the watch face plate used for the embodiment of the original design watch manufacturing machine of FIG. 15 to show its arrangement.
Figure 19:
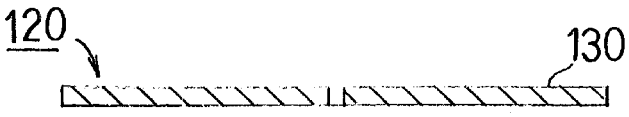
FIG. 19 is a cross sectional view of another type of dial plate used for the embodiment of the original design watch manufacturing machine of FIG. 15 to show its arrangement.
Figure 20:
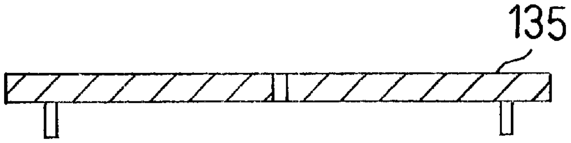
FIG. 20 cross sectional view of a base plate to show its arrangement onto which the under layer of dial plate of FIG. 19 is stuck.
Figure 21:
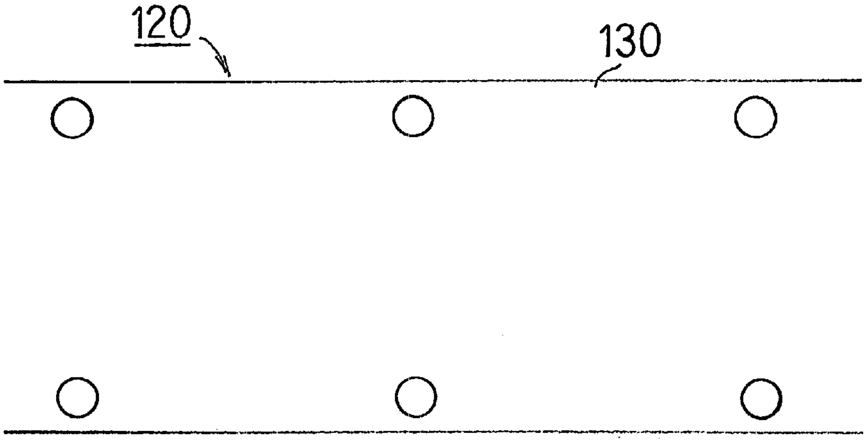
FIG. 21 is a cross sectional view of the dial plate which is made in belt form.

Hereafter an explanation about structure of the dial plate 120 and mechanical structure of the manufacturing apparatus 114 will be given. At first, a structure of the dial plate 120 will be given. There are two different types of dial plate that consists of metal base plate 126 and an under layer 128, for example made of paper, synthetic resin film or porous coating layer which is formed on the base plate as shown in FIG. 18, or consists only of a sheet of under layer 130, for example made of paper or synthetic resin film as shown in FIG. 19. In case of dial plate consists of the base plate 126 and the under layer 128, a designed pattern to be drawn is printed on the under layer 128 by the drawing means 124 to complete the dial On the other hand, in case of dial plate 120 consists only of the under layer 130, it is stuck on a base plate 135 as shown in FIG. 20 to complete the watch face after printing is attained by the drawing means 124. This under layer 130 is generally shaped as to match the base plate 135 as shown in FIG. 19, however, it may be formed in a sheet film as shown in FIG. 21. In case of dial plate 120 for under layer which is made of sheet film 130, it is punched out in a shape to match the base plate 135 after printing is attained by the drawing means 124 and stuck onto the base plate 135. With regard to the punch out process, a punching means 133 can be comprised in the manufacturing apparatus 114 as shown in FIG. 15 to make the process automated.

In the meantime, one example of mechanical structure of the manufacturing apparatus 114 is shown in FIG. 17. In this embodiment, the supplying means 116 is arranged to select a dial plate 120 from those of various colors and shapes, and of only under layer 130 or of under layer 128 with the base plate 126 in accordance with the direction and push it out to the transporting means 122. In this embodiment each dial plate 120 stocked in the parts storage 118 is put on a carrying case 134 that has opened portion from which side the processing is done as shown in FIG. 17, and it is supplied within the carrying case 134 to the transporting means 122.

The transporting means 122 consists of a belt like moving member 122*a* such as a belt feeder by which the dial plate 120 can be brought toward the drawing means for processing, and stopped to be processed. In this moving member 122*a,* a holding member such as a hollow portion or projection portion, which is not shown in the Figure, is arranged to keep and bring the dial plate 120 or the case 134 toward each operation unit. In another embodiment the supplying means 116 and the transporting means 122 is combined in one body and the supplying means 116 directly supplies the dial plate to the printing position.

The drawing means 124 consists of such as a thermal printer, an ink jet printer or a photo exposing printer, and its printing or exposing head member 124*a* is arranged at the printing position to print or to expose the designed pattern on the under layer 128 or 130 of dial plate 120. For example, when a thermal printer is utilized, the printing head member 124*a* consists of a face type dot heater which is in the same shape as the dial plate 120 and the designed pattern is drawn by an operation that the printer head 124*a* is pressed vertically and a ink on a ribbon is transferred to the under layer 128 or 130 on dial plate. In this case of employment of printing head member 124*a* with the face type dot heater, it need only to move not horizontally but vertically against the dial plate 120, since, it realizes shorter time of printing.

Hereafter an explanation of manufacturing process for the original design dial made by the above described manufacturing machine will be given. At first a customer as operator confirms a feeling and appearance of finished goods with viewing the samples 140 which are displayed in a show case as well as viewing the dial plate 120 which is shown on the display monitor 132 as shown in FIG. 16, chooses a dial plate 120 and designates color, pattern, style and other factors of it by an ordering through the operation board 104. On the display monitor 132, explanation for function of the touch switch as the operation board 104 are given. in character or illustration as well as the parts of dial 120 to be selected, and the customer touches directly the displayed explanation with his fingers to input his selection.

The situation of inventory is also shown by a display of lamp 146 or on the display monitor 132 which are arranged in correspondence with the position of samples of the goods 140, and it tells if the designated model is sold out and out of stock. The customer selects his model under confirmation of this situation.

The customer inputs a design pattern for dial other than the above described selection of dial plate 120. The designing of dial is accomplished by selection or composition of various design variation which is output from a memory means 113 and displayed on the monitor screen 132 and the customer achieves it with confirmation of displayed pattern through the operation board 104. On the other hand, the designing is also attained by input of a designed pattern of a picture or photograph through the input means 106, and by changing and modifying them while viewing the display of the designed pattern on a monitor screen 132. Further, the designing is also accomplished by direct input of a drawing pattern on the display monitor 132 on the spot In this time, parts of the drawing pattern, such as characters, signs and marks can be output independently from the memory means 113 and added to the design of dial.

There is an arrangement that above described selection of dial plate 120 and creation of original design for dial are possible to be attained by the control of operation board 104 in arbitrary order as well as the selection and creation are accomplished in the predetermined order of process in accordance with the steps of dial manufacturing which is specified on the display monitor 132. The customer checks, confirms the appearance of the designed dial to be completed on the display monitor 132, amends it when it need, and then orders for the manufacturing apparatus 114 to begin the actual process.

The control apparatus 108 drives the manufacturing apparatus 114 in accordance with the inputted direction and design information by the customer. The supplying means 116 chooses a dial plate 120 within the carrying case 134 in accordance with the output signal from the operation control means 110 and pushes it out on the transporting means 122. The dial plate 120 is brought by the transporting means 122, and the created and selected original design pattern of the dial is drawn on the under layer 128 and 130 of the dial plate 120 by the drawing means 124.

In one embodiment, a printer is employed as a designed pattern drawing means on the dial. A thermal printer, an ink jet printer or a photo exposing printer can be employed as the drawing means 124. In case of the thermal printer, ink ribbons each of which is containing one of dye from 4 colors of Y, M, C and K, are placed between the dial plate 120 and the printing head 124*a* and they are pressed by the head 124*a* for each dye of the 4 colors to be transferred thermally onto the dial 120 to develop the colored design pattern. In another embodiment for an ink jet printer, each ink including dye is directly sprayed on the dial plate 120 without using ink ribbons to draw the designed pattern. Further in other embodiment for a photo exposing printer, a photo sensitive emulsion layer is coated on the dial plate 120 and an exposure of light is achieved to figure the designed pattern in accordance with the design information. Then the dial plate 120 is brought and pushed to the outlet hole 142.

There is an arrangement that the above described manufacturing process can be seen directly through a transparent glass, or it can be monitored at the printing process on the display monitor screen 132 by an electronic camera.

Further in other embodiment, there is an arrangement that the surface of dial plate is covered by an ultraviolet ray absorbing film, or stickable characters or marks with metallic gloss such as made by plating, are transferred onto the dial and stuck to give a stereoscopic feeling after the drawing of dial.

Figure 22:
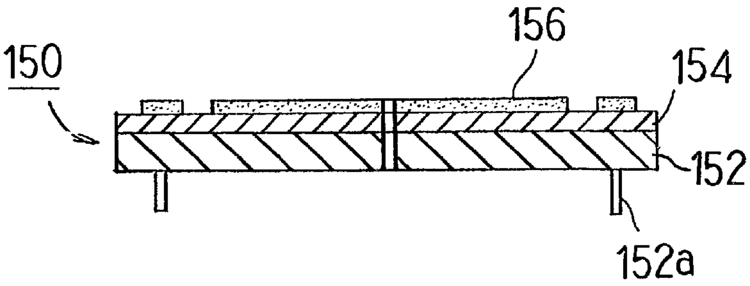
FIG. 22 is a cross sectional view of one embodiment of the original design dial for the original design watch manufacturing machine of FIG. 15.
Figure 23:
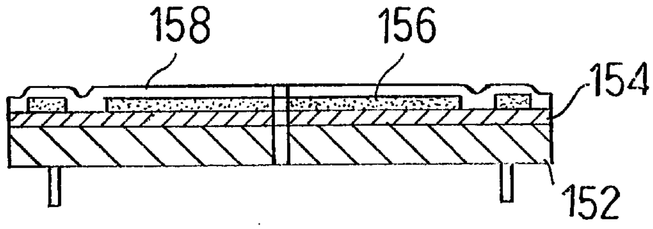
FIG. 23 is a cross sectional view of the original design dial of FIG. 22 in which the printed layer of it is covered by an ultraviolet ray absorption film.

One example of the original design dial for watch made by the above described manufacturing machine is shown in FIG. 22. In this Figure the original design dial 150 consists of a metallic base plate 152 which is arranged to have foot portion 152*a* at the back side of it, an under layer 154 which is made of paper and stuck on the base plate, and printed layer 156 which is formed on the under layer. The under layer is arranged to give higher adhesion to the printed layer 156. The material paper for the under layer 154 can select from fine paper, super fine paper or gloss paper which are smooth at their surface, and use of them gives the dial good feeling and appearance of finished goods. The printed layer 156 is drawn in accordance with the designed pattern which is drawn as described above on the under layer 154.

It is possible to use merely a product as the dial in which the printed layer 156 is formed on the under layer 154 as shown in FIG. 22. However, it is preferable that an arrangement of sticking a transparent ultraviolet ray absorption film 158 which is covering the printed layer 156 is added to the dial after printing. In this embodiment the ultraviolet ray absorption film 158 blocks the ultraviolet ray and prevents a fading of the printed pattern 156 by a chemical reaction of ultraviolet ray.

Figure 24:
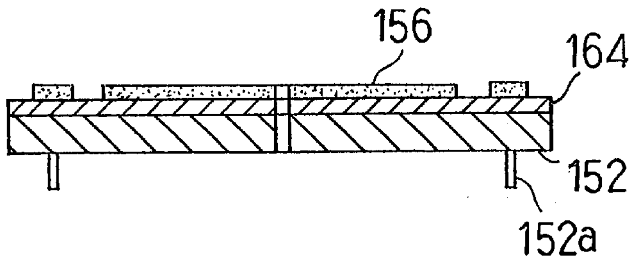
FIG. 24 is a cross sectional view of another embodiment of the original design dial used for the embodiment of the original design watch manufacturing machine of FIG. 15.
Figure 25:
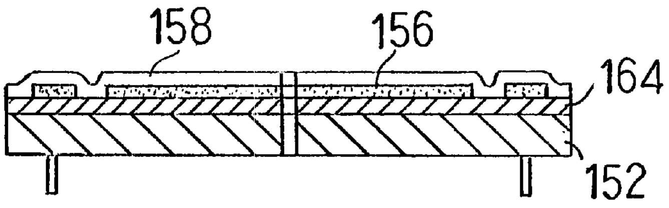
FIG. 25 is a cross sectional view of the original design dial of FIG. 24 in which the printed layer of it is covered by an ultraviolet ray absorption film.

FIG. 24 is a cross sectional view of another embodiment of the original design dial made by the above described manufacturing machine. The same index is used for the same portion of the dial as shown in FIG. 22. This original design dial also consists of a metallic base plate 152, an under layer 164 which is stuck on the base plate, and printed layer 156 which is formed on the under layer in the same manner as the above described dial. The under layer 164 in this embodiment is made of a synthetic resin glossy film or a transparent film, such as a film for Over Head Projector. The under layer of this kind can give also higher adhesion between the printed layer 156 and the under layer 164. Even in this embodiment the arrangement of sticking transparent ultraviolet ray absorption film which is covering on the printed layer 156 and the under layer 164 may be employable as shown in FIG. 25.

Figure 26:
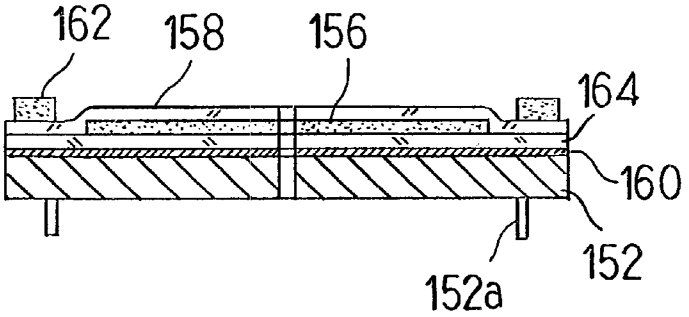
FIG. 26 is a cross sectional view of the original design dial of FIG. 24 which a transparent under layer is used.

In this embodiment of the employment of transparent film as the under layer 164, the metallic base plate can be seen through the under layer 164 and it gives higher metallic gloss through the under layer 164. Another arrangement of some kind of pattern made by fine work on the base plate 152 can be applicable for the ornamental purpose. For example, a pattern of rays of rising sun which is composed of straight lines in a radial manner, is engraved on the base plate 152 and a silver plated layer 160 is formed beforehand on the base plate as shown in FIG. 26. The above described under layer 164 is made on the plated layer 160 and then the printed layer 156 is formed on the under layer by the above described manner. The dial made by this manner appears that the designed pattern is made by a direct printing on the metal plate with the pattern of rays of rising sun, and it gives much higher grade and stereoscopic feeling and appearance.

The stereoscopic feeling can be emphasized by the employment of transparent ultraviolet ray absorption film 158 on the printing layer 156. Moreover, an use of watch characters with metallic gloss 162 on the ultraviolet ray absorption film 158 can further emphasizes the stereoscopic feeling as shown in FIG. 26.

Figure 27:
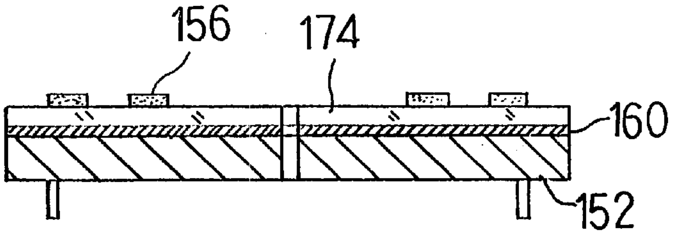
FIG. 27 is a cross sectional view of other embodiment of the original design dial used for the embodiment of the original design watch manufacturing machine of FIG. 15.

The under layer 154 and under layer 164 for the above described embodiment is formed by sticking to the base plate 152 before or after the printing is completed. In other embodiment, the under layer 174 formed by other manner than sticking may be applicable. In this embodiment a synthetic resin porous coating is made on the base plate 152 as shown in FIG. 27. Further, it is possible to make this porous coating under layer 174 transparent. In this embodiment, as the engraved designed pattern and plated layer 160 on the base plate 152 which is made by above described manner can be seen through the under layer 174, it provides the dial giving metallic gloss and stereoscopic feeling and appearance.

As described above, when the under layer 154 or 174, or the under layer 164 is applied in these embodiment, it provides the original design dial with good adhesion. Since, even in the embodiment with an ink jet printer, it is accomplished the drawing in good quality by spraying ink of the ink jet printer.

In the embodiment of drawing by ink jet printer, it is preferable to use a coloring pigment as ink and dot spraying to prevent an occurrence of color deformity.

ADVANTAGES OF THE INVENTION

As described above, according to the present invention, because it provides a manufacturing machine of original design watch or original design dial that is made and sold in accordance with the design information selected, prepared or drawn on a monitor screen by a customer himself, the original design watch with much individuality can be made by a small scale machine and it is suitable to set up at a front of retail shop. Same time the machine is suitable for a vending machine to be operated by a customer himself because the operation can be easily attained only by a selection and a direction with viewing the monitor screen, and it does not need any knowledge of mechanical operation of the machine.

What is claimed is:

1. An original design watch manufacturing machine comprising:

an input apparatus of design information for a watch;

means for furnishing automatically watch hands, a cover glass and a housing assembly including a watch housing, a movement put in said watch housing and a dial plate put on said movement, wherein said watch hands, cover glass and housing assembly are previously stocked, in accordance with said design information;

means for forming a designated pattern on said dial plate; and means for assembling said watch hands, cover glass and housing assembly into a completed watch.

2. The original design watch manufacturing machine according to claim 1, further comprising:

a supplying means which chooses said housing assembly from a plurality of previously stocked housing assemblies, a transporting means which brings said housing assembly being supplied by said supplying means to each position for processing;

a dial drawing means which draws a designated pattern on said dial plate of said housing assembly brought to its position in accordance with design drawing pattern information;

a watch hands furnishing mean which attaches said watch hands to said movement of said housing assembly brought to its position;

a cover glass fitting means which attaches said cover glass to said watch housing of said housing assembly brought to its position;

an operation control apparatus which governs the operation of said supplying means, said transporting means, said dial drawing means, said watch hands furnishing means and said cover glass fitting means; and a design information processor which supplies said design drawing pattern information to said dial drawing means in accordance with the design information from said input apparatus.

3. The original design watch manufacturing machine according to claim 2, wherein said designated pattern is drawn on said dial plate of said housing assembly by printing in accordance with said design drawing pattern information.

4. The original design watch manufacturing machine according to claim 3, wherein said dial plate of said housing assembly has an under layer formed on the surface of said dial plate for making the printing easier.

5. The original design watch manufacturing machine according to claim 3, wherein said printing is performed by using a face type dot heater which is in the same shape as said dial plate.

6. The original design watch manufacturing machine according to claim 1 or 2, further comprising means for selecting and attaching mark member onto the surface of said dial plate after forming said designated pattern.

7. The original design watch manufacturing machine according to claim 1 or 2, wherein said housing assembly is carried and supported with a carrying case and is brought out in a state that said housing assembly is adapted in said carrying case.

8. The original design watch manufacturing machine according to claim 1 or 2, further comprising packaging means for packaging said completed watch in a package member.

9. The original design watch manufacturing according to claim 8, wherein said housing assembly is carried and supported by a carrying case and is brought out in a state that said housing assembly is provided in said carrying case, and wherein said carrying case is a part of said package member.

10. The original design watch manufacturing machine according to claim 2, wherein said cover glass is fixed to said watch housing by using melted or welded manner.

* * * * *